(12) United States Patent
Podgorski et al.

(10) Patent No.: US 10,458,335 B2
(45) Date of Patent: Oct. 29, 2019

(54) MINIMUM PRESSURE SHUT-OFF VALVE

(71) Applicant: Hamilton Sundstrand Corporation, Windsor Locks, CT (US)

(72) Inventors: David J. Podgorski, Suffield, CT (US); Peter M. Ballard, Enfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 979 days.

(21) Appl. No.: 13/621,376

(22) Filed: Sep. 17, 2012

(65) Prior Publication Data

US 2014/0075950 A1 Mar. 20, 2014

(51) Int. Cl.
*F02C 7/232* (2006.01)
*F23N 1/00* (2006.01)
*F16K 15/03* (2006.01)

(52) U.S. Cl.
CPC ............ *F02C 7/232* (2013.01); *F16K 15/033* (2013.01); *F23N 1/007* (2013.01); *Y10T 137/87193* (2015.04); *Y10T 137/87241* (2015.04)

(58) Field of Classification Search
CPC .... F16K 15/033; F16K 15/026; F16K 17/046; F16K 15/025; F23N 1/007; F23N 2035/24; F02C 7/232
USPC ......... 60/734, 741; 137/512.1, 538; 251/205
See application file for complete search history.

(56) References Cited

U.S. PATENT DOCUMENTS

| | | | |
|---|---|---|---|
| 4,493,187 A | 1/1985 | Hansen | |
| 4,596,321 A * | 6/1986 | Harper et al. | 188/322.15 |
| 4,719,749 A * | 1/1988 | Greune et al. | 60/39.094 |
| 5,110,269 A | 5/1992 | Fallon | |
| 5,235,806 A | 8/1993 | Pickard | |
| 5,339,636 A | 8/1994 | Donnelly et al. | |
| 5,448,882 A | 9/1995 | Dyer et al. | |
| 5,927,064 A | 7/1999 | Dyer et al. | |
| 6,357,219 B1 | 3/2002 | Dudd, Jr. et al. | |
| 6,666,015 B2 | 12/2003 | Dyer | |
| 6,996,969 B2 | 2/2006 | Dalton | |
| 7,322,373 B2 * | 1/2008 | Lewis | 137/516.29 |
| 7,997,062 B2 | 8/2011 | Sun et al. | |
| 2003/0047216 A1 * | 3/2003 | Kelly | 137/538 |
| 2007/0062582 A1 * | 3/2007 | Ohtsuki et al. | 137/538 |
| 2007/0170389 A1 * | 7/2007 | Koizumi | 251/205 |
| 2014/0069102 A1 * | 3/2014 | Satienpoch et al. | 60/734 |

* cited by examiner

*Primary Examiner* — William H Rodriguez
*Assistant Examiner* — Thomas P Burke
(74) *Attorney, Agent, or Firm* — Carlson, Gaskey & Olds, P.C.

(57) ABSTRACT

A minimum pressure shut-off valve closes off fuel flow responsive fuel pressure being below a predefined pressure. A sleeve includes at least a first flow window and a second flow window. The second window includes a notch providing a flow area based on an axial position of a spool moveable within the sleeve.

11 Claims, 8 Drawing Sheets

MINIMUM PRESSURE SHUT-OFF VALVE

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

A fuel system for a gas turbine engine meters and controls fuel flow to the combustor and other portions of the gas turbine engine that utilizes fuel flow and pressure for operating actuators and other control elements. During startup and shutdown of the gas turbine engine fuel flow and pressure may be below desired levels for operation. It is desirable to prevent fuel flow to the gas turbine engine, actuators and other control elements until such time as required pressure and flow are present. It is therefore desirable to control and prevent fuel flow to the combustor and other elements of the gas turbine engine until such time as the fuel pressure and flow are within a predetermined operating range.

SUMMARY

A disclosed fuel system for a gas turbine engine includes a minimum pressure shut-off valve for closing off fuel flow to an outlet in response to fuel pressure being below a predefined pressure. The shut-off valve includes a sleeve defining a bore that extends along an axis and includes at least a first flow window and a second window. The second window includes a notch for providing a flow area based on an axial position of a spool moveable within the sleeve. The spool controls or allows fuel flow through the first and second windows when fuel pressure is above a minimum level and closes off fuel flow below the minimum value.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
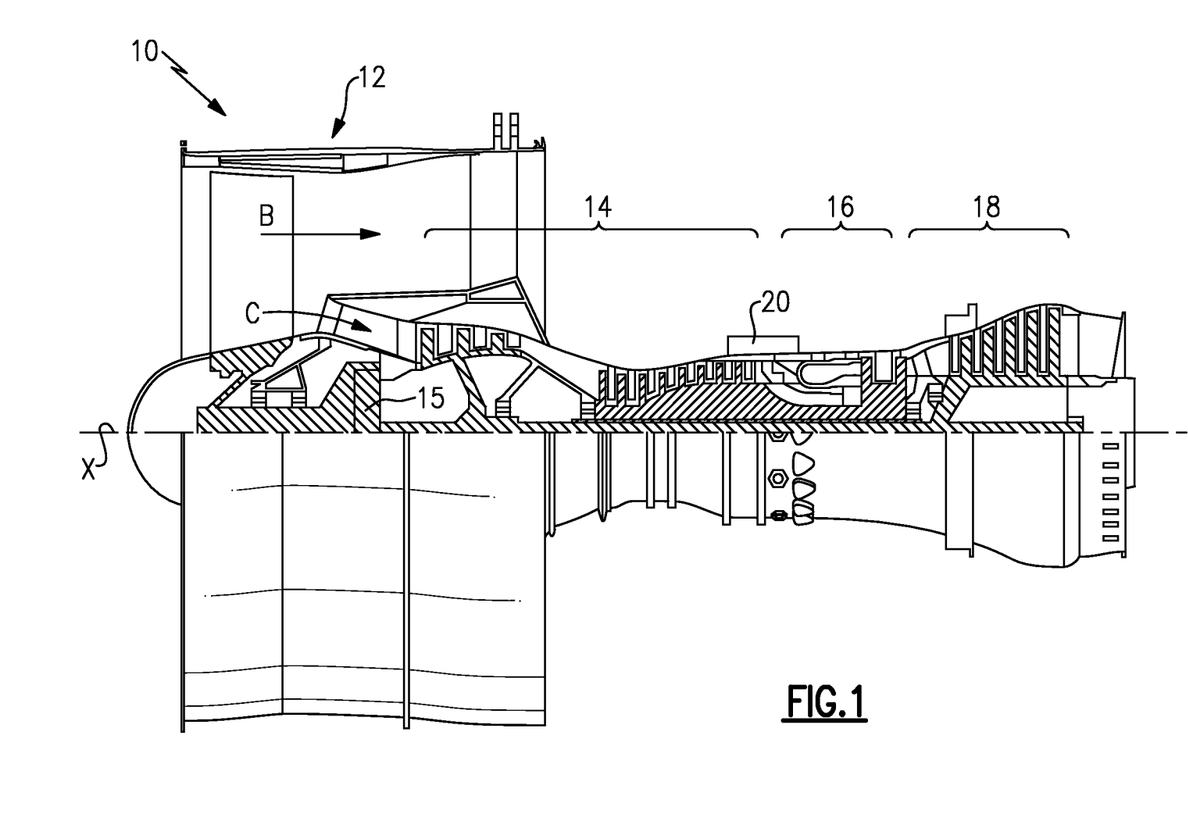
FIG. 1 is a schematic view of an example gas turbine engine.

FIG. 1 schematically illustrates an example gas turbine engine 10 that includes a fan section 12, a compressor section 14, a combustor section 16 and a turbine section 18. Alternative engines might include an augmenter section (not shown) among other systems or features. The fan section 12 drives air along a bypass flow path B while the compressor section 14 draws air in along a core flow path C where air is compressed and communicated to a combustor section 16. In the combustor section 16, air is mixed with fuel and ignited to generate a high pressure exhaust gas stream that expands through the turbine section 18 where energy is extracted and utilized to drive the fan section 12 and the compressor section 14. In this example, the turbine section 18 drives the fan section 12 through a geared architecture 15 such that the fan section 12 may rotate at a speed different than the turbine section 18.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section 14.

The example gas turbine engine includes a fuel system 20 that supplies fuel from a fuel supply to the combustor section 16 and also to other devices within the gas turbine engine that may utilize fuel for heat exchanging or for powering actuators.

Figure 2:
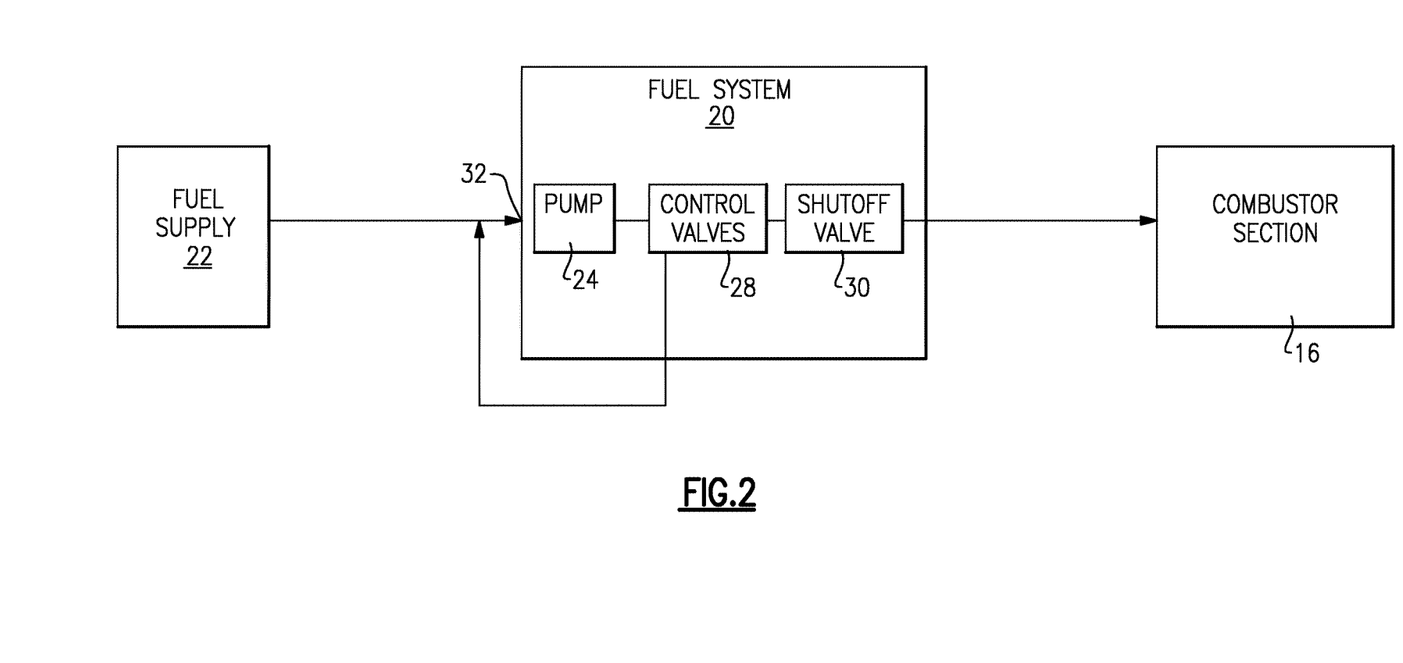
FIG. 2 is a schematic view of an example fuel system for a gas turbine engine.

Referring to FIG. 2, the example fuel system 20 is schematically illustrated and includes a fuel pump 24 that receives fuel from a fuel supply 22. The fuel pump 24 includes an inlet 32 that draws fuel from the fuel supply 22 and also receives fuel that may be bypassed or drained from the fuel system 20. The example fuel system 20 includes a minimum pressure shut-off valve 30 and also other control valves schematically illustrated at 28. The minimum pressure shut-off valve 30 shuts off fuel flow from the fuel system 20 to the combustor section 16 or other devices within the gas turbine engine 10 when a fuel pressure and flow falls below a predetermined minimum.

Accordingly, during operation and specifically during start-up and shut-down operation, fuel flow is shut-off to the combustor section 16 until such time as pressure and flow is above the predetermined minimum. The predetermined minimum fuel pressure and flow is that level desired for combustion and operation of other features of the gas turbine engine 10 (FIG. 1).

Figure 3:
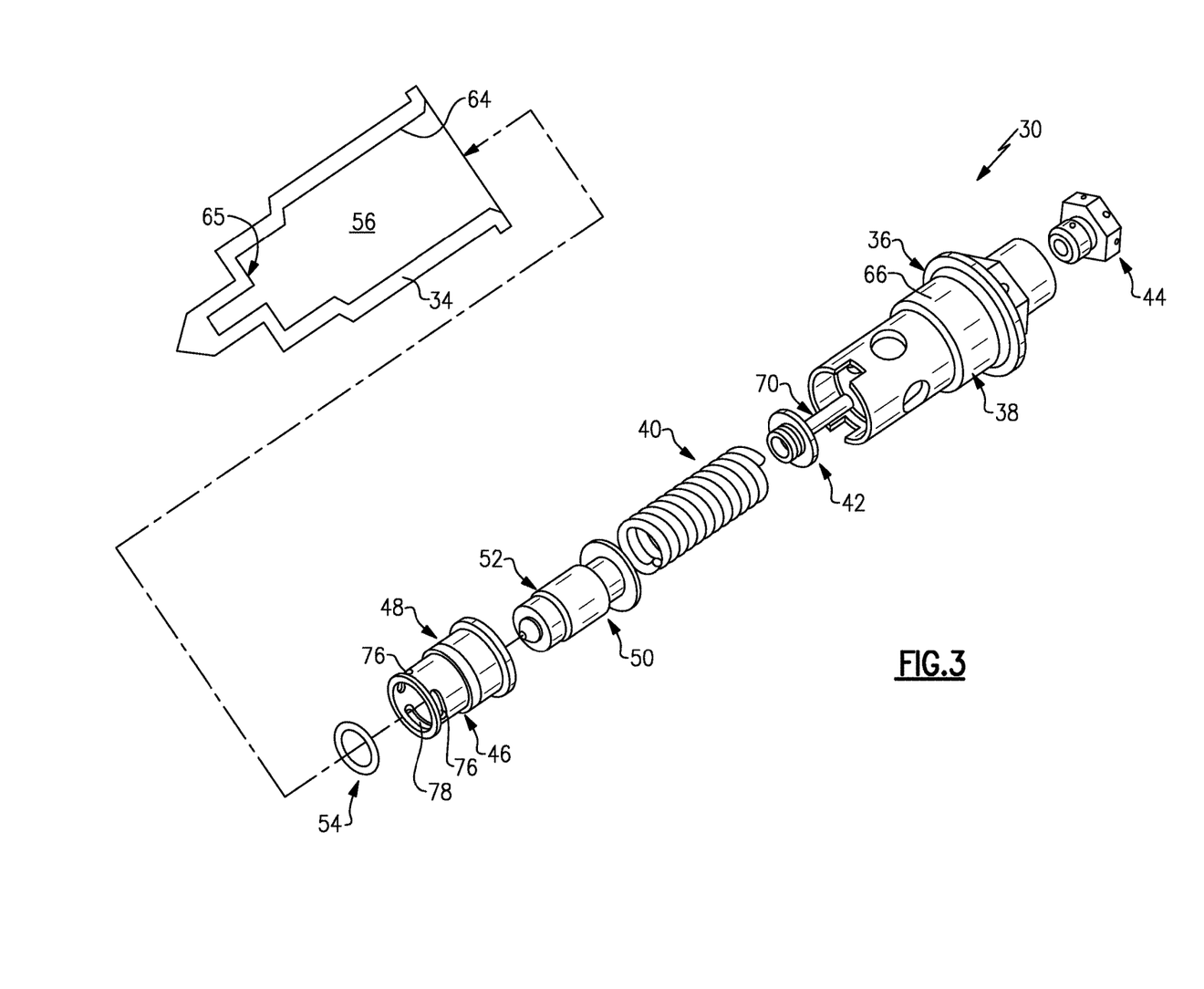
FIG. 3 is an exploded view of an example minimum pressure shut-off valve.
Figure 4:
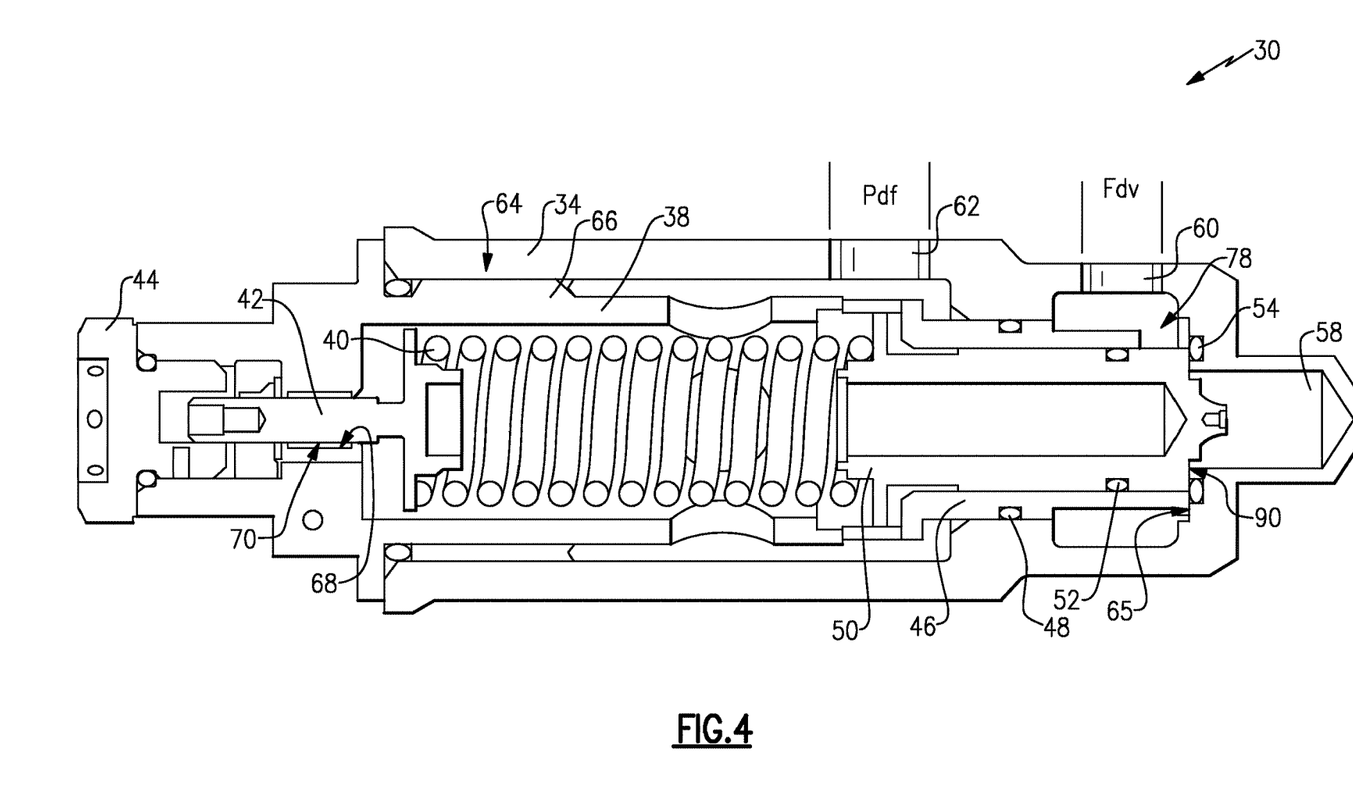
FIG. 4 is a cross-sectional view of the example shut-off valve in a closed position.

Referring to FIGS. 3 and 4, an example shut-off valve 30 includes a main housing 34 within which is disposed a sleeve 46 and a spool 50. A face 74 (FIG. 12) of the sleeve 46 is held against a forward surface 65 of the main housing 34 by a cap 38. The example cap 38 includes threads 66 that engage complementary internal threads 64 defined within the main housing 34. A seal 36 is provided between the main housing 34 and the cap 38. The cap 38 is threaded into the main housing 34 to hold the sleeve 46 against the forward surface 65 and a face seal 54 disposed within a chamber 56 of the main housing 34.

The cap 38 also holds a spring 40 against the spool 50 disposed within the sleeve 46. The spring 40 is held in place on an end opposite the spool 50 by a spring seat 42. The example spring seat 42 is threaded into threads 68 in the cap 38 such that it can be adjusted to provide an adjustment of the biasing force provided by the spring 40. The spring biases the spool 50 towards a closed position shown in FIG. 4. A plug 44 is threaded into the cap 38 to seal off the opening interface through the thread 70 of the spring seat 42 is received within the cap 38.

The spool 50 is received within a bore of the sleeve 46 and is movable responsive to pressure differences between an inlet 58, an outlet 60, and a control port 62 defined within the main housing 34. The control port 62 communicates fluid pressure to a back side of the spool 50. Fuel entering the inlet 58 will proceed through windows defined in the sleeve 46 and then through the outlet 60. The specific axial relationship of the spool 50 relative to the sleeve 46 uncover windows 78, 76 defined within the sleeve 46 to govern fluid flow between the inlet 58 and the outlet 60. A spool seal 52 is disposed between the spool 50 and the sleeve 46. A sleeve seal 48 is disposed between the sleeve 46 and the main housing 34.

The spring 40 exerts a biasing force on the spool 50 that drives the spool 50 against the face seal 54. The face seal 54 is disposed within a groove defined within the main housing 34 at the forward surface 65. The sleeve 46 also engages the face seal 54 to prevent fuel flow around the sleeve 46. Accordingly, fuel flow must flow from the inlet 58 through windows 76, 78 defined in the sleeve 46 and out the outlet 60. The spool 50 selectively blocks the windows 76, 78 defined within the sleeve 46 to govern and regulate fluid flow through the outlet 60.

The disclosed shut-off valve 30 is actuateable responsive to a pressure differential across the spool 50 in combination with the biasing force provided by the spring 40. Pressure is communicated to through the control port 62 to a back side of the spool 50. Fuel pressure at the inlet 58 must rise to a level above the combined forces provided by the fuel pressure and spring force on the spool 50. The shut-off valve 30 is shown in FIG. 4 in a closed position. In the closed position, the spring force and pressure forces are at an imbalance condition that holds the spool against the face seal 54 to prevent fuel flow.

Figure 5:
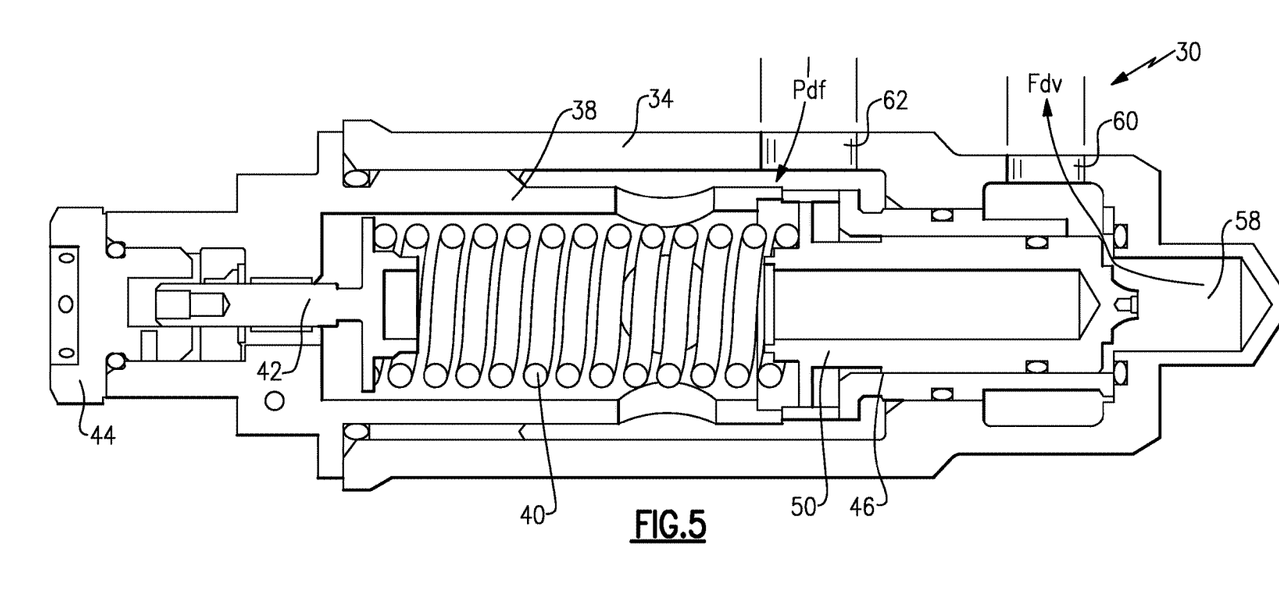
FIG. 5 is a cross-section view of the example shut-off valve in an initial starting position.

Referring to FIG. 5, the example shut-off valve 30 is shown in an initial startup position. In the initial startup position, fuel pressure at the inlet is increased to generate an imbalance that lifts the spool 50 off the face seal 54 such that a passageway from the inlet 58 to the outlet 60 is provided.

Figure 6:
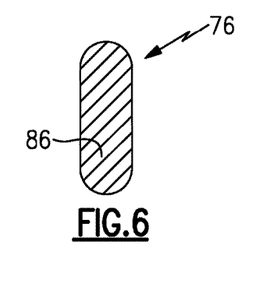
FIG. 6 is a schematic view of a window defined within a sleeve of the shut-off valve.
Figure 7:
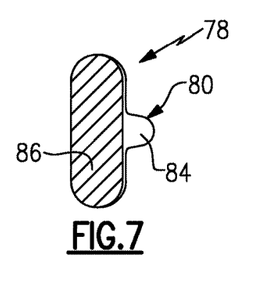
FIG. 7 is a schematic view of another window defined within the sleeve of the example shut-off valve.

Referring to FIGS. 6 and 7 with continued reference to FIG. 5, the example sleeve 46 includes four windows, two without a notch indicated at 76 and two that includes a notch 84 indicated at 78. Each of the windows 76, 78 includes a generally oval shape. The notched window 78 includes the notch 84 that extends axially forward of the oval shaped common with windows 76.

In an initial startup position illustrated in FIG. 5, the spool 50 moves axially rearward off of the face seal 54 to uncover the notch portion 80 of the window 78. Accordingly, the notch portion 80 provides the fuel flow area 84 from the inlet 58 through the outlet 60. The remaining portions of the windows 76, 78 are blocked as indicated at 86. In this position, only the windows 78 that includes the notch 80 accommodates fuel flow between the inlet 58 and the outlet 60. The other windows 76 remain blocked and do not allow fuel flow.

Figure 8:
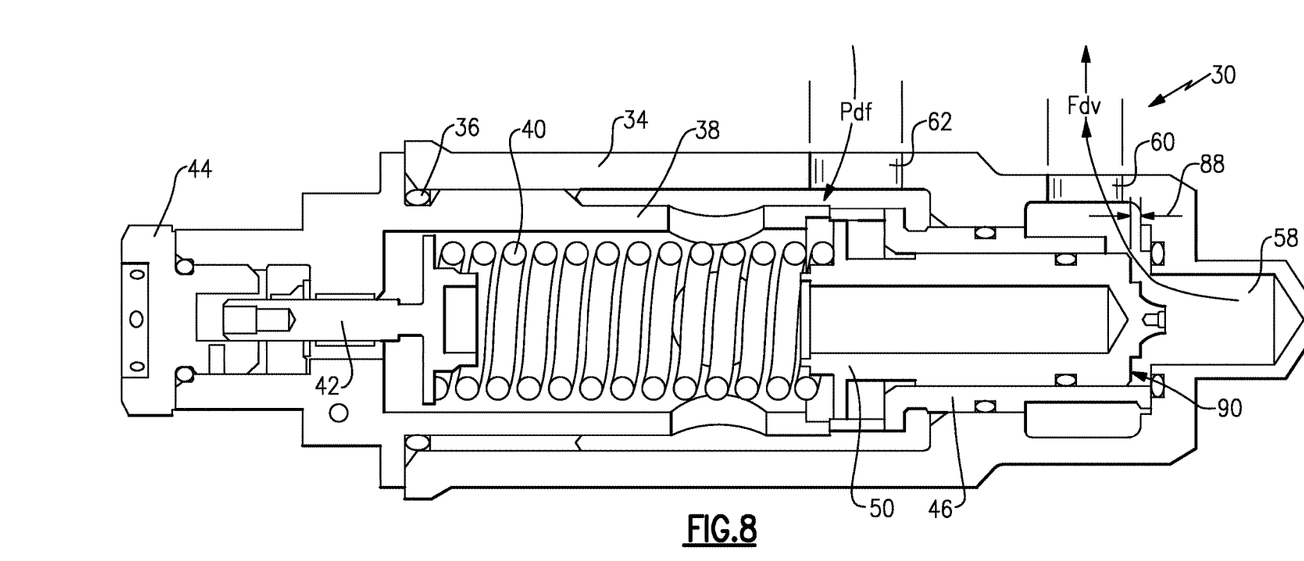
FIG. 8 is a cross-sectional view of the example shut-off valve in an operational mode.
Figure 9:
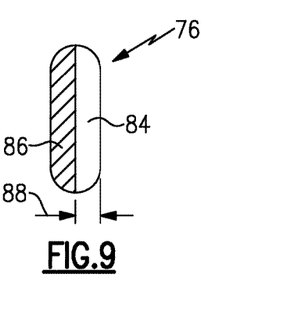
FIG. 9 is a schematic view of a flow window of the shut-off valve in the operational condition.
Figure 10:
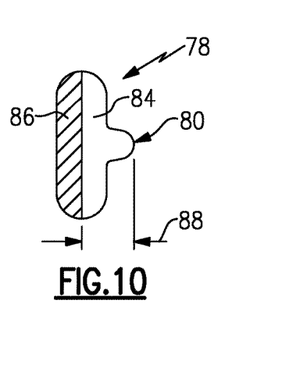
FIG. 10 is another view of another window including a notch in an example operational position.

Referring to FIGS. 8, 9, and 10, the control shut-off valve 30 is shown in a partially open position where the forces exerted on the spool valve 50 are in a balanced condition such that the spool valve 50 has opened more flow area for flow between the inlet 58 and the outlet 60. In this example, the spool 50 is moved such that not only are the notches 80 unblocked but also a portion of the windows 76 and 78 are open to fuel flow.

The axial stroke of the spool 50 indicated at 88 corresponds to a desired flow area of the windows 76, 78 open to fuel flow between the inlet 58 and outlet 60. In one non-limiting dimensional embodiment, the axial stroke 88 of the spool 50 is approximately 0.040 inches (1.016 mm) The axial stroke corresponds within an opening flow area 84 between all of the windows 76, 78. In this example, the axial position of the spool 50 is related to the opening area 84 of the flow window 76, 78 by a ratio between 0.000 and 1.2600. In another disclosed example embodiment an axial position of the spool is related to the opening area by a ratio between 0.000 and 1.2438.

Referring to FIGS. 11-15, the example spool 50 and sleeve 46 are shown in cross-section. The total stroke range 82 of the spool 50 relative to the sleeve 46 provides the desired gain in fuel pressure relative to the axial position. The example sleeve 46 includes the four windows 76, 78, although a different number of windows could be utilized and is within the contemplation of this invention to provide the desired flow area relative to an axial position of the spool 50.

Figure 11:
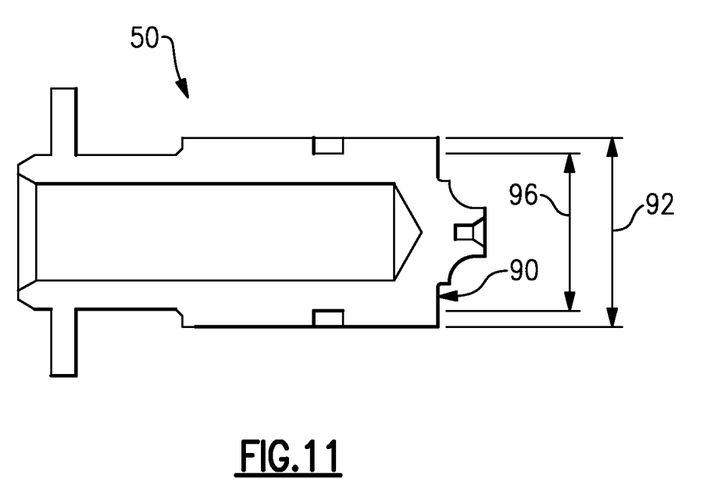
FIG. 11 is a cross-sectional view of the example spool.
Figure 12:
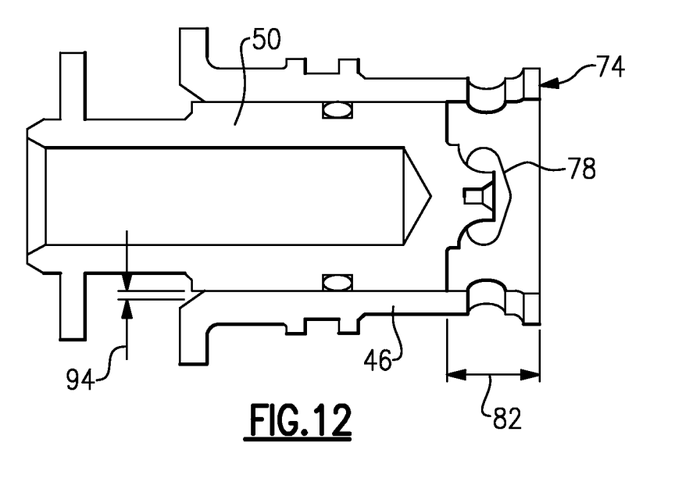
FIG. 12 is a cross-sectional view of the example spool and sleeve.
Figure 13:
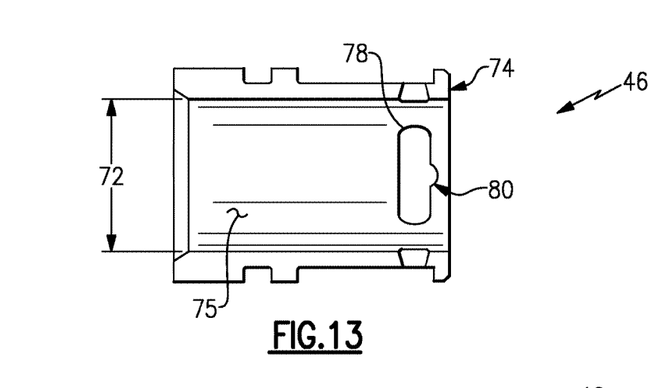
FIG. 13 is a cross-sectional view of the example sleeve.
Figure 14:
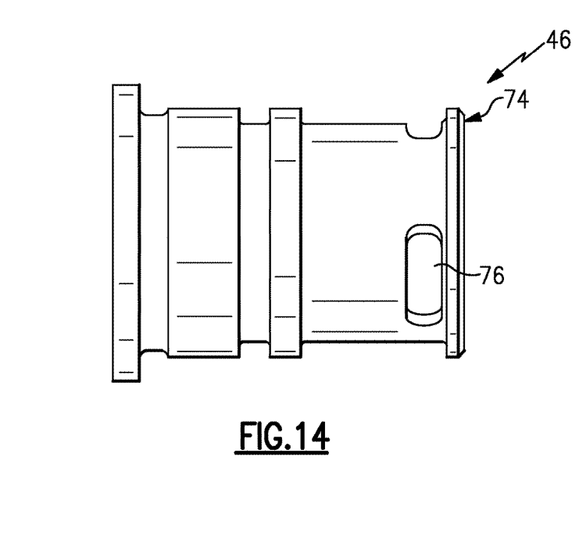
FIG. 14 is a side view of the example sleeve.
Figure 15:
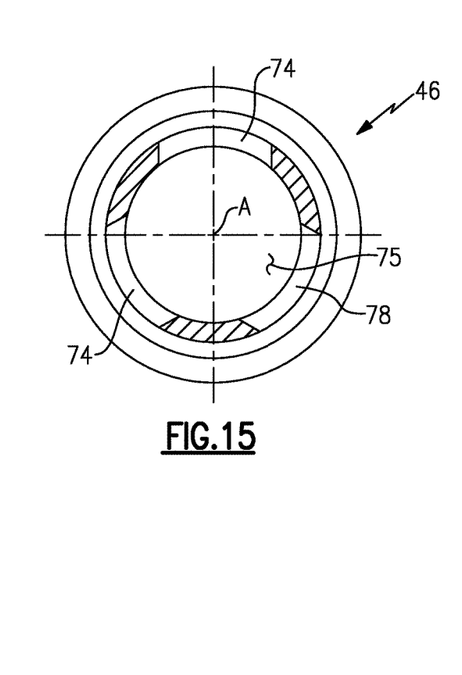
FIG. 15 is a sectional view through windows of the example sleeve.

The sleeve 46 includes a bore 75 having a diameter 72 that corresponds with an outer diameter 92 of the spool 50 to provide a clearance. The clearance between the spool 50 and the sleeve 46 prevents leakage past the spool 50 while allowing movement within the bore 75. In one disclosed example, a ratio between the bore diameter 72 and the outer diameter 92 of the sleeve 50 is between 0.9980 and 0.9990. In another disclosed example, the ratio of the bore diameter 72 to the outer diameter 92 of the spool 50 is between about 0.9994 and 0.9996.

The clearance between the spool 50 and the bore 75 defines an annular spacing related to the outer diameter of the spool 50. In one non-limiting dimensional embodiment, the clearance between the bore diameter 72 and outer diameter 92 of the spool 50 is between about 0.0002 inches and 0.0007. inches. The clearance further defines a leakage path between the spool 50 and the bore diameter 72. A ratio of the clearance to an outer diameter 92 of the spool is indicative of the leakage path. In one disclosed example embodiment, a ratio between the clearance 94 and the outer diameter 92 of the spool is between about 0.0009700 and 0.0009800. In another example embodiment, a ratio between the clearance 94and the outer diameter 92 is between about 0.000976 and 0.0009798.

The example spool 50 includes a seal surface 90 engages the face seal 54 to provide an effective seal diameter 96. The seal diameter 96 accounts for pressures and forces that provide the desired seal desired for shutting off fuel flow at a minimum pressure level. In this example, the minimum seal diameter is balanced between the surface 90 and the face seal 54. The example seal diameter is related to the outer diameter of the spool 50 according to a ratio of the seal diameter 96 to the outer diameter 92 of the spool 50 that is between about 0.8100 and 0.8350. In another disclosed example, a ratio of the seal diameter to the outer diameter 92 is between about 0.8150 and 0.8344.

Accordingly, the example shut-off valve 30 controls fuel flow to maintain a minimum pressure desired for operation. Moreover, the example shut-off valve 30 stops fuel leakage from the system during shutdown and startup operations.

Although an example embodiment has been disclosed, a worker of ordinary skill in this art would recognize that this disclosure is more than just a material specification and that certain modifications would come and are contemplated within the scope of this disclosure. For that reason, the following claims should be studied to determine the scope and content of this disclosure.

What is claimed is:

1. A minimum pressure valve comprising:
   a sleeve defining a bore that extends along an axis and includes at least a first window, a second window and a third window, with only the third window including a notch and the first window and the second window including an identical size and shape;
   a spool movable within the bore that restricts flow through the first window and the second window;
   a cap received within a chamber holding the sleeve against an inner surface of the chamber and a spring against the spool; and
   a spring seat received within the cap that is movable for adjusting a minimum force exerted by the spring on the spool.

2. The minimum pressure valve as recited in claim 1, wherein a ratio of an outer diameter of the spool to the bore is between 0.9980 and 0.9990.

3. The minimum pressure valve as recited in claim 2, wherein a ratio of a clearance between the outer diameter of the spool and the bore is between 0.9994 and 0.9996.

4. The minimum pressure valve as recited in claim 1, including a main housing defining the chamber with an inlet port, an outlet port and a control port, wherein the sleeve and spool are mounted within the main housing in fluid communication with each of the inlet port, outlet port and control ports.

5. The minimum pressure valve as recited in claim 4, including a seal disposed within the chamber sealing between the sleeve and the inner surface of the chamber.

6. The minimum pressure valve as recited in claim 5, wherein a ratio of a seal diameter and an outer diameter of the spool is between 0.8100 and 0.8350.

7. A fuel system for a gas turbine engine comprising:
   a fuel supply;
   a fuel pump in fluid communication with the fuel supply; and
   a minimum pressure valve for closing off fuel flow to an outlet responsive to fuel pressure being below a predefined pressure, the minimum pressure valve including:
   a sleeve defining a bore that extends along an axis and includes at least identical first window and second windows;
   a third window, wherein only the third window includes a notch extending axially forward of the third window;
   a spool movable within the bore that restricts flow through the first window and the second window;
   a main housing defining a chamber with an inlet port, an outlet port and a control port, wherein the sleeve and spool are mounted within the main housing in fluid communication with each of the inlet port, outlet port and control ports; and
   a cap received within the chamber holding the sleeve against an inner surface of the chamber and a spring against the spool, and a spring seat received within the cap that is movable for adjusting a minimum force exerted by the spring on the spool.

8. The fuel system for a gas turbine engine as recited in claim 7, wherein a ratio of an outer diameter of the spool to the bore is between 0.9980 and 0.9990.

9. The fuel system as recited in claim 8, wherein a ratio of a clearance between the outer diameter of the spool and the bore to the outer diameter of the spool is between 0.9994 and 0.9996.

10. The fuel system as recited in claim 7, including a seal disposed within the chamber sealing between the sleeve and the inner surface of the chamber.

11. The fuel system as recited in claim 10, wherein a ratio of a seal diameter and an outer diameter of the spool is between 0.8100 and 0.8350.

\* \* \* \* \*